J. A. McCONNELL.
Carriage Spring and Reach.

No. 229,898.                                    Patented July 13, 1880.

Witnesses:                                      Inventor:
                                                John A. McConnell

UNITED STATES PATENT OFFICE.

JOHN A. McCONNELL, OF HULTON, PENNSYLVANIA.

CARRIAGE SPRING AND REACH.

SPECIFICATION forming part of Letters Patent No. 229,898, dated July 13, 1880.

Application filed February 16, 1880.

*To all whom it may concern:*

Be it known that I, JOHN A. MCCONNELL, of Hulton, Allegheny county, Pennsylvania, have invented a new and useful Improvement in Carriage Springs and Reaches, which improvement is fully set forth in the following specification, reference being had to the accompanying drawings.

Similar letters of reference indicate corresponding parts.

This invention belongs to the spring-reach class of carriage-gears.

The object is to produce an easy-riding, strong, and light carriage, and at the same time obviate the rolling of the axles, tendency to pull out of track, side motion, and clumsy appearance which have heretofore characterized this class of vehicles.

Figure 1:
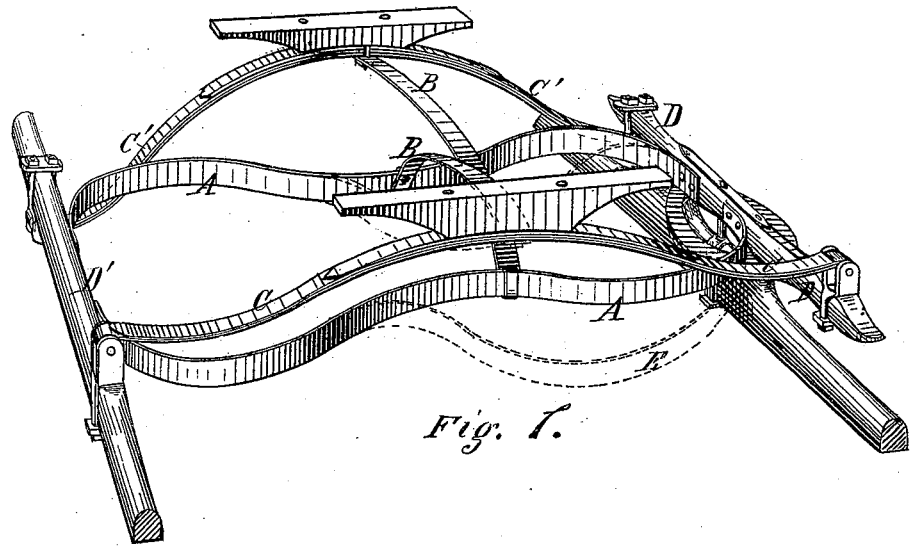
Figure 2:
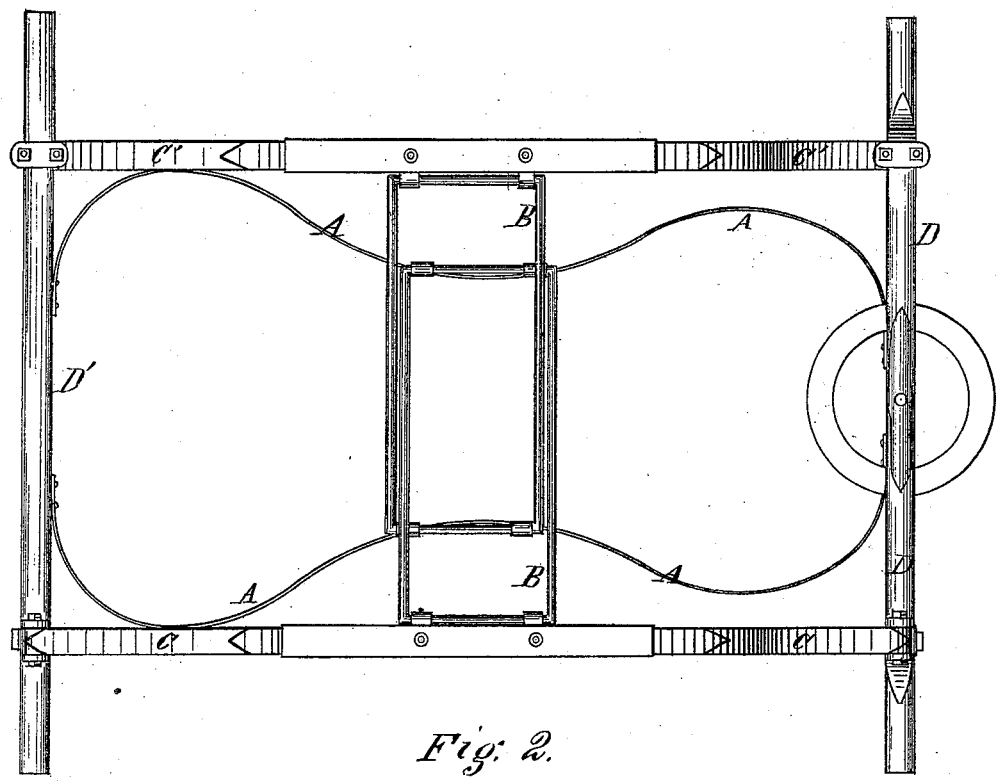

Figure 1 is a perspective view of this invention as applied to a side-spring buggy. Fig. 2 is a top view of the same.

The most important point of this invention is the constructing of spring-reaches for vehicles by using one or more plates of spring-steel set edgewise—that is to say, the broad way of the steel bar perpendicular to the earth when the buggy is standing in its ordinary position on the wheels, as seen at A.

The reaches A A are bent or curved laterally from their points of attachment to the axle and head-block. I do not confine myself to any particular method of attaching them, except that I so construct them at their ends that, when attached to the said axle and head-block, they will sit on their edges, as shown and described, throughout their length. When thus attached they will not spring vertically, but will perform the same functions as the ordinary stiff reaches. Being inflexible vertically, they are not liable to be broken by sudden jolts when heavy weights are carried in the vehicle. They are arranged in the same horizontal plane with the axle and head-block, and spring laterally and longitudinally, and give a ready adjustment, which causes the wheels to be easily lifted over obstructions without giving severe shocks to the body of the vehicle.

The springs C C' and reaches A A are fastened in front to the head-block or front axle, and in the rear to the rear axle.

The equalizing-braces B B hold the wheels in track, prevent side motion by acting as equalizers, and cause the reaches A A to support part of the load and act in unison with the side springs, C C'.

By referring to the accompanying drawings it will be seen that the braces B B connect with the side springs, C C', on the opposite side of the buggy from where they connect with the spring-reaches A A. Therefore, when weight is placed on one side of the vehicle-body, thereby depressing the side spring, C C, on that side, the equalizing-braces B B transmit the action and part of the weight to the spring-reaches A A on the opposite side. This lengthens the reaches A A and throws the front and rear wheels apart on the opposite side of the load simultaneously with those on the same side, and simultaneously depresses the springs C C' on each side of the vehicle. This equalized up-and-down action of the springs C C' on each side of the vehicle prevents the wheels from pulling out of track, as they do in spring-reach vehicles in which each side acts by itself.

The equalizing-braces B B may be either one or two on each side of the buggy, made of plates of spring-steel fastened rigidly to the reaches A A and side springs, C C', substantially as shown at B B, Fig. 1; or the braces may be one or two iron or steel rods on each side, working in journals at each end, where they fasten to the spring-reaches A A and to the side springs, C C', substantially as shown at B B, Fig. 2.

The side springs, C C', fasten at the ends in shackles either under the head-block and rear axle, as C' C', or on top of the head-block and rear axle, as C C, Fig. 1.

In the use of my spring-reach, constructed of plates of spring-steel set edgewise, as herein described, I do not confine myself to the particular curves shown in the accompanying drawings. Almost any variety of curve will accomplish the purpose of allowing the reaches to lengthen or contract in consequence of the jostling of the vehicle-body or the draft upon the wheels. I also bend the reaches A A perpendicularly, substantially as shown at E, Fig. 1, where it is necessary to accommodate them to any particular form of vehicle or vehicle-body, as I also anticipate filing applications for other patents in which I adapt this spring-steel elastic reach to elliptic-spring and spar-spring buggies.

In the drawings I have shown two flat bars, A A. These are employed in order that I may provide a wider base and better facilities for attaching and supporting the other mechanism of my invention, hereinbefore described.

It will be readily understood that a single bar, A, made of suitable strength and attached at the centers of the axle and head-block, may be employed when only the function of a reach is desired, and the same results obtained as has been set forth for the two bars.

I am aware that it is not new to construct springs for vehicles composed of two bars each bent upward from the horizontal between the axle and head-block, and so as to diverge from each other from their central parts outward toward each end, and having a longitudinal curved and twisted or torsional form, so as to spring vertically and longitudinally, and I do not claim such construction as my invention.

Having thus described the construction and purposes of my invention, I claim as my invention and wish to secure by Letters Patent—

1. In a vehicle, a reach composed of two flat flexible bars curved laterally and having their flat faces or sides set vertically to the horizontal plane in which they are arranged, and springing laterally and longitudinally, substantially as set forth.

2. In a vehicle-spring, the elastic equalizing-braces B B, having their upper ends secured to the side springs and their opposite or lower ends carried diagonally downward to opposite sides of and secured to the running-gear, substantially as set forth.

3. The spring-reaches A A and equalizing-braces B B, in combination with side springs, C C', substantially as described and shown.

4. In vehicle springs and reaches, the combination of the side springs, C C', the spring-reaches A A, and equalizing-braces B B with the head-block or front axle and the rear axle of a vehicle, substantially as described and shown.

JOHN A. McCONNELL.

Witnesses:
SAMUEL MURPHY,
JOHN JAHN.